A. BYRAM.
METHOD OF OBTAINING WATER.
No. 173,208. Patented Feb. 8, 1876.
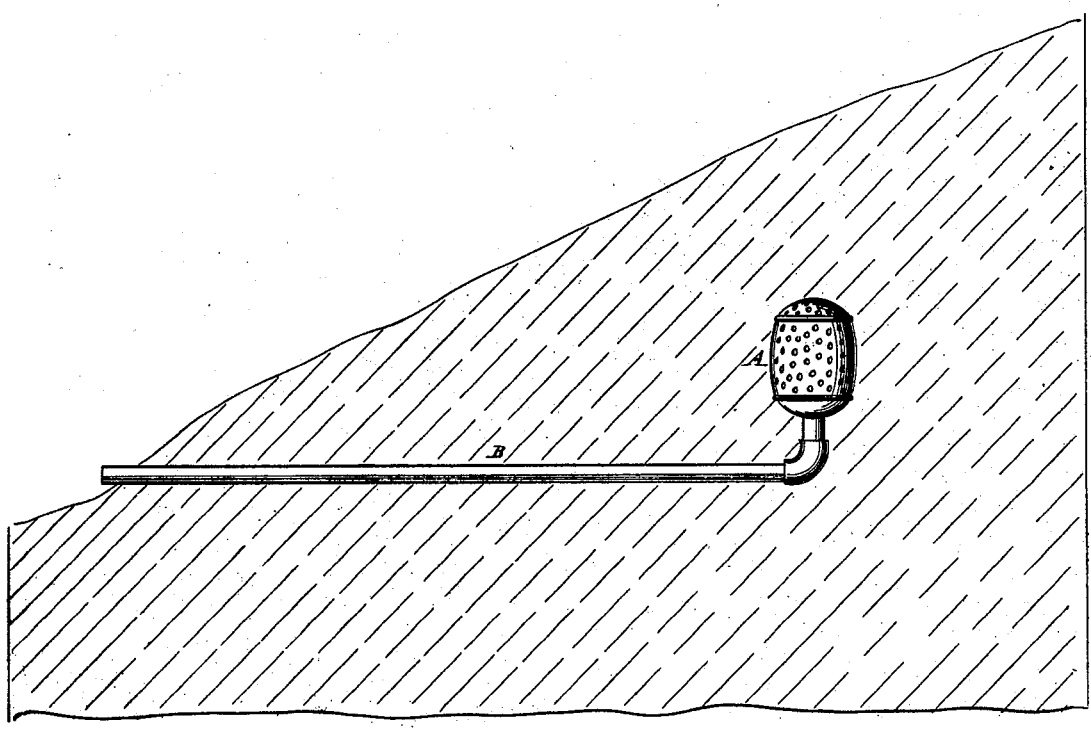
WITNESSES:
INVENTOR:
Augustus Byram
BY
ATTORNEYS.

UNITED STATES PATENT OFFICE.

AUGUSTUS BYRAM, OF ATCHISON, KANSAS.

IMPROVEMENT IN METHODS OF OBTAINING WATER.

Specification forming part of Letters Patent No. 173,208, dated February 8, 1876; application filed February 20, 1875.

*To all whom it may concern:*

Be it known that I, AUGUSTUS BYRAM, of Atchison, Atchison county, Kansas, have invented a new and Improved Device for Obtaining Water from Moist Soil, of which the following is a specification:

My invention has for its object to obtain water in rolling prairie lands where a porous soil rests upon a bed of clay or other formation which resists the downward passage of moisture. The means I employ are of themselves simple and well known, and my invention therefore consists, principally, in their application to the purpose indicated, I having found that by their use, as hereinafter described, I am enabled to obtain a plentiful supply of water from localities where the soil is not excessively wet, but only moderately moist.

The drawing accompanying this specification shows a section of a side hill or prairie roll, with my device for collecting water in position.

A is a ball or hollow case, made of metal, glass, clay, wood, or other suitable material, and which is perforated with numerous small holes.

The hollow case A may be made spherical, cylindrical, cubical, or of any other desired form, and may be of any convenient size.

With the bottom of the hollow case A is connected the end of a pipe, B, of such a length as to extend from the case A to the surface of the ground in a horizontal or slightly-inclined position.

In using the device, the perforated case A is set in the ground at the depth of five feet, more or less, where the soil is moist, with the pipe B extending out to the surface of the ground in a horizontal direction, or with a slight downward inclination.

With this arrangement the water in the soil will collect in the hollow case A, and will flow out through the pipe B, and may be received in a trough or other convenient receptacle.

As the water collects in the case A and flows out through the pipe B, it will form natural courses heading to said case, and causing a continuous flow of water. This will enable farmers in Kansas and in other States where the land is of a similar formation to readily obtain a supply of water for watering their stock, and for irrigating purposes, without the trouble and expense of digging deep wells and pumping up the water with windmills or other mechanism.

In cases where one perforated case and pipe will not furnish a sufficient supply of water, several of the cases and pipes may be used, the said cases being placed at the distance of fifty feet, more or less, from each other.

I do not claim a pipe having a strainer on the end; but

What I do claim is—

The method of gathering and drawing water from the earth by burying therein the perforated vessel A, and connecting the bottom thereof with the surface of ground by a pipe on a lower level than the vessel, as shown and described.

AUGUSTUS BYRAM.

Witnesses:
JOHN P. BROWN,
W. W. HUHUNGTON.